(12) United States Patent
Zhu et al.

(10) Patent No.: US 11,938,974 B2
(45) Date of Patent: Mar. 26, 2024

(54) SERIES-PARALLEL MONORAIL HOIST BASED ON OIL-ELECTRIC HYBRID POWER AND CONTROLLING METHOD THEREOF

(71) Applicants: CHINA UNIVERSITY OF MINING AND TECHNOLOGY, Xuzhou (CN); XUZHOU LIREN MONORAIL TRANSPORTATION EQUIPMENT CO., LTD., Xuzhou (CN)

(72) Inventors: Zhencai Zhu, Xuzhou (CN); Hao Lu, Xuzhou (CN); Yuxing Peng, Xuzhou (CN); Gongbo Zhou, Xuzhou (CN); Yu Tang, Xuzhou (CN); Hua Chen, Xuzhou (CN); Zaigang Xu, Xuzhou (CN); Mingzhong Wang, Xuzhou (CN); Mai Du, Xuzhou (CN); Fuping Zheng, Xuzhou (CN)

(73) Assignees: CHINA UNIVERSITY OF MINING AND TECHNOLOGY, Xuzhou (CN); XUZHOU LIREN MONORAIL TRANSPORTATION EQUIPMENT CO., LTD., Xuzhou (CN)

( * ) Notice: Subject to any disclaimer, the term of this patent is extended or adjusted under 35 U.S.C. 154(b) by 0 days.

(21) Appl. No.: 18/250,673

(22) PCT Filed: Sep. 30, 2022

(86) PCT No.: PCT/CN2022/123319
§ 371 (c)(1),
(2) Date: Apr. 26, 2023

(87) PCT Pub. No.: WO2023/178982
PCT Pub. Date: Sep. 28, 2023

(65) Prior Publication Data
US 2023/0303130 A1      Sep. 28, 2023

(30) Foreign Application Priority Data

Mar. 21, 2022   (CN) .......................... 202210276160.3

(51) Int. Cl.
*B61C 7/00* (2006.01)
*B61C 17/00* (2006.01)
(Continued)

(52) U.S. Cl.
CPC ............... *B61C 7/00* (2013.01); *B61C 17/00* (2013.01); *F16H 49/00* (2013.01); *G05D 13/60* (2013.01)

(58) Field of Classification Search
None
See application file for complete search history.

(56) References Cited

U.S. PATENT DOCUMENTS 3,677,188 A *  7/1972  Bordes ................... B61B 13/04
                                                                    188/41
6,321,657 B1 * 11/2001  Owen ..................... E01B 25/08
                                                                    188/41
(Continued)

FOREIGN PATENT DOCUMENTS

CN        104228849 A        12/2014
CN        205989739 U  *      3/2017
(Continued)

OTHER PUBLICATIONS

CN 215436395 U English translation (Year: 2022).*
(Continued)

*Primary Examiner* — Daniel L Greene
(74) *Attorney, Agent, or Firm* — HAUPTMAN HAM, LLP

(57) ABSTRACT

A series-parallel monorail hoist based on an oil-electric hybrid power and a controlling method thereof. The monorail hoist includes a cabin, a hydraulic driving system, a
(Continued)

lifting beam, a gear track driving and energy storage system, and a speed adaptive control system connected in series with each other and travelling on a track. The monorail hoist is capable of implementing an independent drive by an electric motor or a diesel engine in an endurance mode, a hybrid drive of the electric motor and the diesel engine in a transportation mode, and a hybrid drive of the diesel engine and a flywheel energy storage system in a climbing mode, according to different operating conditions that include conditions of an upslope, a downslope and a load. Power requirements for the monorail hoist under various operating conditions are satisfied, and the excess energy is recovered during the process of travelling.

9 Claims, 2 Drawing Sheets

(51) Int. Cl.
 *F16H 49/00* (2006.01)
 *G05D 13/60* (2006.01)

(56) References Cited

U.S. PATENT DOCUMENTS

| | | | | |
|---|---|---|---|---|
| 2002/0134277 | A1* | 9/2002 | Illguth | B61K 1/00 104/93 |
| 2004/0244633 | A1* | 12/2004 | Witmer | B61C 11/06 104/93 |
| 2007/0051856 | A1* | 3/2007 | Rossmann | E21F 13/004 246/1 R |
| 2008/0048497 | A1* | 2/2008 | Donnelly | B66C 13/18 307/19 |
| 2009/0288578 | A1* | 11/2009 | Hepner | B61B 13/04 105/141 |
| 2010/0102568 | A1* | 4/2010 | Bonin | F03D 9/007 290/55 |
| 2014/0375272 | A1* | 12/2014 | Johnsen | B60L 58/19 320/136 |
| 2015/0232097 | A1* | 8/2015 | Luther | G01C 21/3415 701/1 |

FOREIGN PATENT DOCUMENTS

| | | | | |
|---|---|---|---|---|
| CN | 107914716 | A | * 4/2018 | ............... B61B 3/00 |
| CN | 213008086 | U | * 4/2021 | |
| CN | 112758111 | A | 5/2021 | |
| CN | 113581221 | A | 11/2021 | |
| CN | 215436395 | U | * 1/2022 | |
| CN | 114735035 | A | 7/2022 | |
| EP | 2154016 | A1 | 2/2010 | |

OTHER PUBLICATIONS

CN 205989739 U English Translation (Year: 2017).*
CN 107914716 A English Translation (Year: 2018).*
CN 213008086 U English Translation (Year: 2021).*
Written Opinion of the International Searching Authority issued in International Patent Application No. PCT/CN2022/123319; dated Jan. 3, 2023; 10 pgs.
International Search Report issued in International Patent Application No. PCT/CN2022/123319; dated Jan. 3, 2023; 5 pgs.

* cited by examiner

SERIES-PARALLEL MONORAIL HOIST BASED ON OIL-ELECTRIC HYBRID POWER AND CONTROLLING METHOD THEREOF

RELATED APPLICATIONS

The present application is a U.S. National Phase of International Application Number PCT/CN2022/123319 filed Sep. 30, 2022, and claims priority to Chinese Application Number 202210276160.3, filed Mar. 21, 2022.

TECHNICAL FIELD

The present disclosure relates to the field of a transportation of a monorail hoist in the coal mine, and in particular to a series-parallel monorail hoist based on an oil-electric hybrid power and a controlling method thereof.

BACKGROUND

Under the requirements of vigorously constructing safe, high-yield, and efficient modern coal mines in China, the modernization degree of an auxiliary transportation has become an important indicator to measure the modernization level of a coal mine. The features of the auxiliary transportation system of the coal mine are complex and variable transportation routes, a plurality of intermediate links, and different sizes of materials that need to be transported, which brings great inconveniences to a roadway transportation. As a new type of auxiliary transportation equipment, the monorail hoist has the advantages of not being affected by floor conditions, convenient layouts of the transportation roadways, space saving, high transportation efficiencies, and the like, which has obtained attentions by many coal mine equipment manufacturers and coal mine production units, and has broad development prospects at present.

At present, most downhole monorail hoists rely solely on diesel engines or batteries as their power source. Although monorail hoists with the diesel engines have mature technology and sufficient power output, issues of energy waste and pollution emissions have not been effectively addressed. Although battery monorail hoists are clean and pollution-free, due to limitations of battery capacities as well as the charging and discharging frequency of the batteries, the power output and endurance abilities thereof are relatively poor. Moreover, these two types of the monorail hoists have problems such as high slope, high load, and insufficient power in the actual operation.

In order to solve the above-mentioned problems, Chinese scholars have conducted researches on hybrid power technology for monorail hoists. A Chinese patent application with a publication number of CN113581221A discloses a method for controlling a distributed hybrid power monorail hoist, which solves existing problems of a single power source and improves transportation efficiencies and loading capacities by switching an independent drive or a hybrid drive of an electric motor or a diesel engine, according to torque requirements of the monorail hoist under different operating conditions. However, a method for mixing power thereof is relatively simple, making it difficult to deal with complex traveling operating conditions. The Chinese patent with a publication number of CN104228849B discloses a monorail hoist based on an oil-electric hybrid power and a method for controlling a power output thereof, which adopts the electric motor as a sole power source, and select a battery powered drive or a diesel engine powered by a generator according to different operating conditions, however, the energy of the monorail hoist is subject to multi-level conversions during use, and the loss is large.

SUMMARY

In view of the above-mentioned technical deficiencies, the objectives of the present disclosure are to provide a series-parallel monorail hoist based on an oil-electric hybrid power and a controlling method thereof, which are capable of satisfying the power requirements of the monorail hoist under various operating conditions, and recovering the excess power during the travelling process, thus realizing an energy conservation and an emission reduction.

In order to solve the above-mentioned technical problems, the following technical solutions are adopted in the present disclosure.

Provided by the present disclosure is a series-parallel monorail hoist based on an oil-electric hybrid power and a controlling method thereof. The monorail hoist includes a cabin, a hydraulic driving system, a lifting beam, a gear track driving and energy storage system connected in series with each other and travelling on a track.

The hydraulic driving system includes an explosion-proof diesel engine and a hydraulic pump arranged in a second explosion-proof compartment. The second explosion-proof compartment is in transmission connection with the track through a plurality of hydraulic driving parts, and each of the hydraulic driving parts is connected to an oil circuit of the explosion-proof diesel engine through the hydraulic pump.

The gear track driving and energy storage system include a first explosion-proof compartment equipped with a power battery pack, and an upper end of the first explosion-proof compartment is in transmission connection with the track through a plurality of gear track driving parts.

An explosion-proof motor, a speed regulating motor and an explosion-proof permanent magnet generator that are electrically connected with the power battery pack respectively are arranged in the first explosion-proof compartment; and the explosion-proof motor is mechanically connected with each of the gear track driving parts through a transmission respectively.

An output end of the speed regulating motor is connected with an input end of the transmission gear, a magnetic clutch b of the transmission gear is mechanically connected with an energy storage flywheel, a magnetic clutch c of the transmission gear is mechanically connected with each of the gear track driving parts, and a magnetic clutch a of the transmission gear is mechanically connected with the explosion-proof permanent magnet generator.

Preferably, the monorail hoist further includes a speed adaptive control system, the speed adaptive control system includes a load sensor configured to acquire a load weight of the monorail hoist and installed on the lifting beam, an inclination sensor configured to acquire upslope and/or downslope information of the monorail hoist and installed on a top end of the cabin, and a speed sensor configured to acquire information of an operating speed of the monorail hoist and installed on the top end of the cabin, an electric energy sensor configured to acquire information for stored electric power storage and in circuit connection with the power battery pack, an engine controller in circuit connection with the explosion-proof diesel engine, an AC/DC converter configured to control a charging and/or discharging of the power battery pack, a magnetic control valve installed in a hydraulic brake circuit of a brake arranged in the gear track driving part and the hydraulic driving part, and a fuzzy PID controller installed in the cabin. The fuzzy PID controller includes a single-chip microcomputer and a PID regulator that are electrically connected with each other.

The explosion-proof motor, the speed regulating motor and the explosion-proof permanent magnet generator are electrically connected to a motor controller respectively.

The single-chip microcomputer is electrically connected with the load sensor, the electric energy sensor, the inclination sensor, the speed sensor, the motor controller, and the AC/DC converter respectively. A target speed is calculated according to operation status information of the load weight, the stored electric energy, the upslope and/or downslope, and the speed of the monorail hoist.

The PID regulator calculates a control quantity according to a difference between the target speed and a current speed, and sends a traction or braking command to the motor controller, the engine controller, a clutch controller of the transmission gear and the magnetic control valve that are electrically connected with the PID regulator, until the monorail hoist reaches the target speed.

Preferably, during an operation process of the monorail hoist, driving gears in the gear track driving part are permanently rotated in engagement with a rack under the track, and switched between a driving and an idling according to power requirements, energy is recycled to a flywheel energy storage system when being idle.

Preferably, the cabin and the lifting beam are respectively in transmission connection with the track through a bearing trolley.

Preferably, the cabin is provided with a front one and a rear one, and the cabin, the hydraulic driving part, the gear track driving part and the lifting beam are connected with each other through a connecting bolt in turn.

Further provided by the present disclosure is a method for controlling the series-parallel monorail hoist based on the oil-electric hybrid power, the method is specifically as follows.

The monorail hoist is divided into three types of driving modes including an endurance mode, a transportation mode and a climbing mode, according to conditions of a load weight, an electric power storage, and an upslope and/or downslope, the switching is controlled by the single-chip microcomputer.

When a load of the monorail hoist is lower than 40% of a maximum load, it is identified as the low load, when the load of the monorail hoist is higher than 70% of the maximum load, it is identified as the high load.

It is switched to the endurance mode, when the monorail hoist is in a low load or a downslope track, and a pure oil drive or a pure electric drive is selected at this time.

It is switched to the transportation mode, when the monorail hoist is in a high load or a flat track, and an oil-electric hybrid power drive is selected at this time.

It is switched to the climbing mode, when the monorail hoist is in the high load or an upslope track, and an oil-flywheel energy storage system hybrid drive is selected at this time.

Preferably, an operation in the endurance mode: when the monorail hoist is under the pure oil drive, a single-chip microcomputer controls an explosion-proof motor to be turned off through a motor controller, a magnetic clutch b and a magnetic clutch c to be turned on as well as a magnetic clutch a to be turned off through a clutch controller, an explosion-proof diesel engine to be turned on through an engine controller. The explosion-proof diesel engine drives a hydraulic driving part to operate through a hydraulic pump, a gear track driving part is in a non-driving state, and the flywheel energy storage system is in an energy recovery state to recover idle kinetic energy of driving gears.

When a power battery pack is in a low electric power, the clutch controller controls the magnetic clutch a to be turned on, the magnetic clutch b to be turned on, and the magnetic clutch c to be turned off. The motor controller controls an explosion-proof permanent magnet generator to be turned on, and the speed regulating motor to be turned on. The energy storage flywheel charges the power battery pack through a transmission gear and an explosion-proof permanent magnet generator under a speed regulating control of the speed regulating motor, and the flywheel energy storage system is in an energy outputting state.

When the flywheel energy storage system is in an energy storage state, the clutch controller controls the magnetic clutch a to be turned off, the magnetic clutch c to be turned off, and the magnetic clutch b to be turned on. The motor controller controls the speed regulating motor to be turned on. The power battery pack provides energy, and the speed regulating motor maintains the energy storage flywheel in a stable energy storage state through the transmission gear.

When the monorail hoist is under the pure electric drive, the engine controller controls the explosion-proof diesel engine to be turned off. The clutch controller controls the magnetic clutch a to be turned off, the magnetic clutch b to be turned off, and the magnetic clutch c to be turned off. The motor controller controls the explosion-proof motor to be turned on. The power battery pack provides energy, and the explosion-proof motor drives the gear track driving part to operate through a transmission.

An operation in the transportation mode: the single-chip microcomputer controls the magnetic clutch b and magnetic clutch c to be turned off, the explosion-proof diesel engine and the explosion-proof motor to be turned on. The power battery pack provides power, the hydraulic pump drives the hydraulic driving part to operate, and the transmission drives the gear track driving part to operate.

An operation in the climbing mode: the motor controller controls the explosion-proof diesel engine to be turned on, the explosion-proof motor to be turned off, and the speed regulating motor to be turned on. The clutch controller controls the magnetic clutch a to be turned off, the magnetic clutch b to be turned on, and the magnetic clutch c to be turned on. The explosion-proof diesel engine drives the hydraulic driving part to operate through the hydraulic pump, the energy storage flywheel drives the gear track driving part to operate through the transmission gear under a speed regulating control of the speed regulating motor, and the flywheel energy storage system is in the energy outputting state.

Preferably, when the gear track driving part climbs a slope, the energy storage flywheel provides an auxiliary torque through the transmission gear; the speed regulating motor assists in controlling a rotational speed of the transmission gear and assists the flywheel energy storage system to complete a recovery, an storage, and a release of energy.

Preferably, a lithium iron phosphate power battery is adopted in the power battery pack, it is identified as a low electric power when a power is less than 30% of a total power, and it is identified as a high electric power when the power is greater than 70% of the total power.

A charging and a discharging of the power battery pack is controlled by an AC/DC converter; when being in the low electric power, the energy storage flywheel in the flywheel energy storage system drives the explosion-proof permanent magnet generator to charge the power battery pack through the transmission gear.

The beneficial effects of the present disclosure lie in the following. The present disclosure can achieve an independent drive by an electric motor or a diesel engine in the endurance mode, a hybrid drive of the electric motor and the diesel engine in the transportation mode, and a hybrid drive of the diesel engine and the flywheel energy storage system in the climbing mode, according to different operating conditions including conditions of the upslope track, the downslope track and the load, so as to satisfy the power requirements for the monorail hoist under various operating conditions, and the excess power is recovered during the process of travelling, thus realizing an energy conservation and an emission reduction.

BRIEF DESCRIPTION OF THE DRAWINGS

In order to explain the embodiments of the present disclosure or the technical solutions in the prior art more clearly, the accompanying drawings that need to be used for describing the embodiments or the prior art will be briefly introduced herein. It will be apparent that the accompanying drawings in the following description are only some embodiments of the present disclosure. For those of ordinary skilled in the art, other accompanying drawings can also be obtained from these accompanying drawings without any creative efforts.

DESCRIPTIONS OF REFERENCE NUMERALS

1. Cabin; 5. Bearing trolley; 6. Lifting beam; 7. Track; 8. Connecting bolt; 9. Brake; 201. Gear track driving part; 202. Explosion-proof motor; 203. Transmission; 204. Transmission gear; 205. Energy storage flywheel; 206. Speed regulating motor; 207. Motor controller; 208. Explosion-proof permanent magnet generator; 209. Power battery pack; 210. First explosion-proof compartment; 301. Hydraulic driving part; 302. Explosion-proof diesel engine; 303. Hydraulic pump; 304. Engine controller; 305. Second explosion-proof compartment; 401. Fuzzy PID controller; 402. Load sensor; 403. Electric energy sensor; 404. Inclination sensor; 405. Speed sensor.

DETAILED DESCRIPTION OF THE EMBODIMENTS

The technical solutions in the embodiments of the present disclosure will be clearly and completely described below with reference to the accompanying drawings. It will be apparent that the described embodiments are only a part of the embodiments of the present disclosure, rather than all of the embodiments. Based on the embodiments of the present disclosure, all other embodiments obtained by those of ordinary skilled in the art without any creative efforts fall within the protection scope of the present disclosure.

Figure 1:
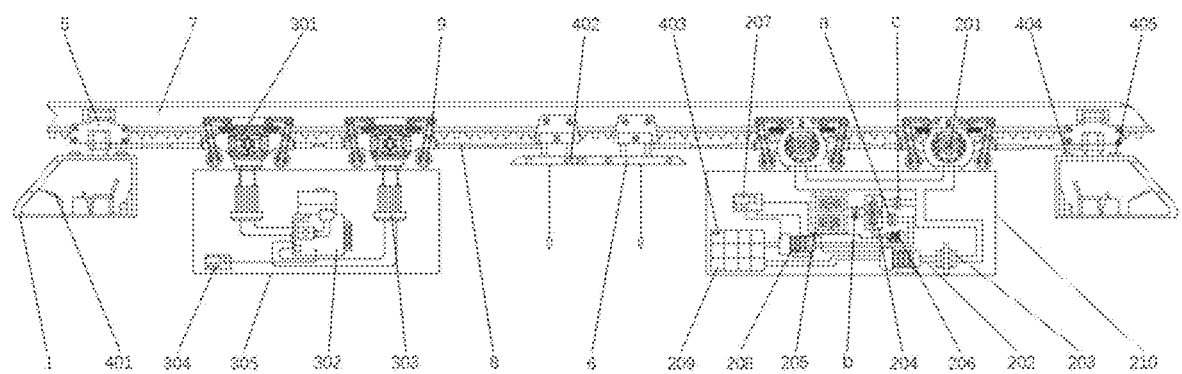
FIG. 1 illustrates a structural schematic diagram of a series-parallel monorail hoist based on an oil-electric hybrid power provided by an embodiment of the present disclosure.
Figure 2:
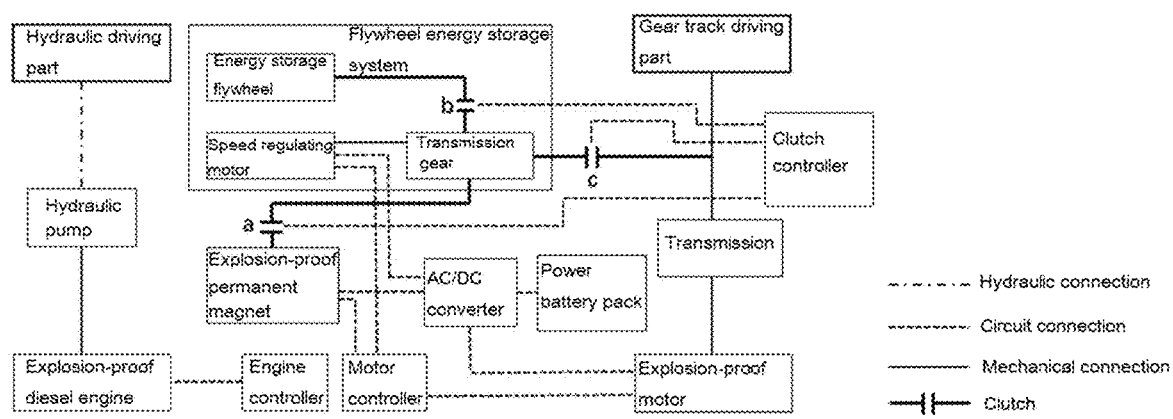
FIG. 2 illustrates a power schematic diagram of the series-parallel monorail hoist based on the oil-electric hybrid power provided by an embodiment of the present disclosure.
Figure 3:
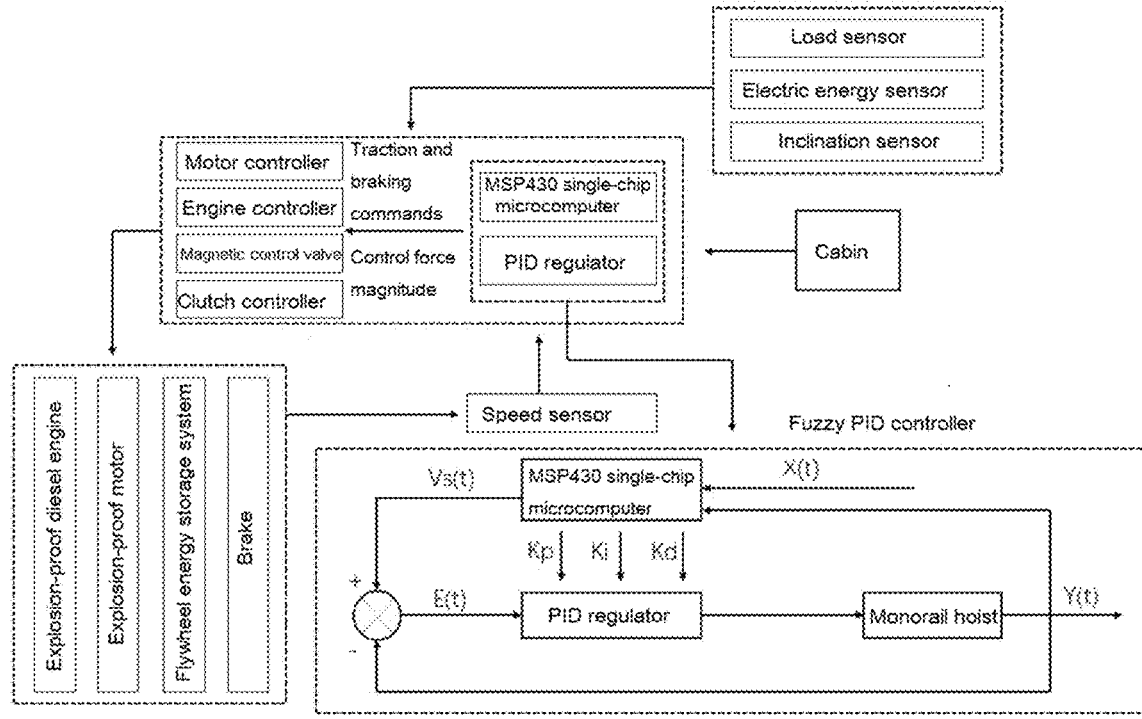
FIG. 3 illustrates a schematic diagram of a speed adaptive control system provided by an embodiment of the present disclosure.
Figure 4:
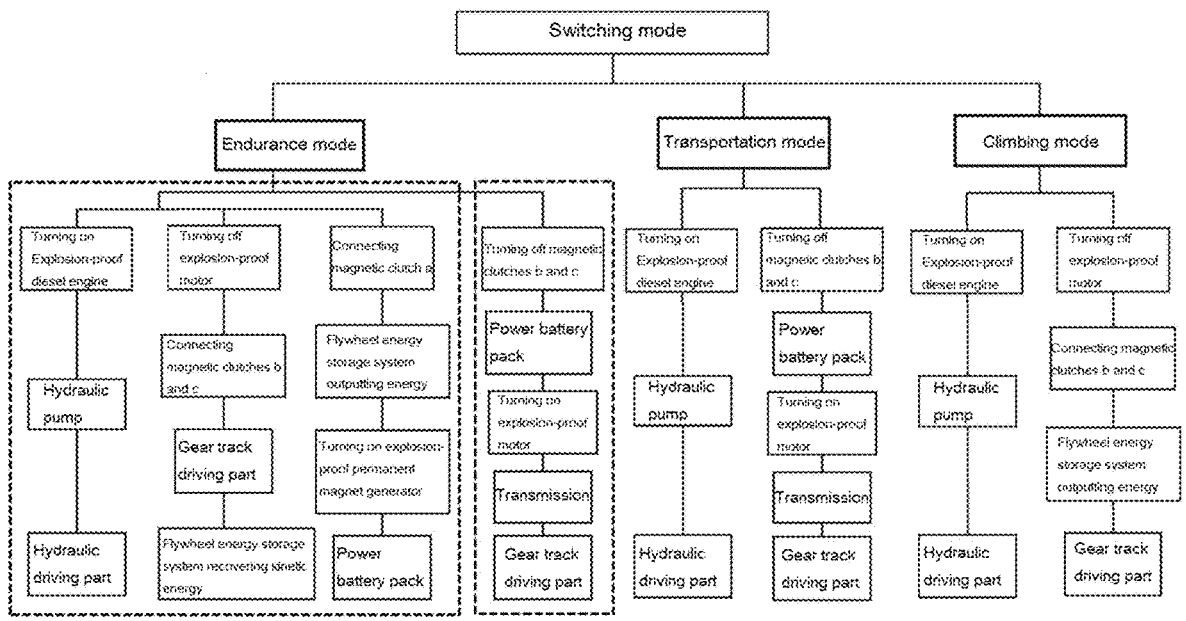
FIG. 4 illustrates a mode switching system diagram provided by an embodiment of the present disclosure.

As illustrated in FIGS. 1 to 4, provided is a series-parallel monorail hoist based on an oil-electric hybrid power and a controlling method thereof. The monorail hoist includes a cabin 1, a hydraulic driving system, a lifting beam 6, a gear track driving and energy storage system connected in series with each other and travelling on a track 7. The monorail hoist further includes a speed adaptive control system.

The hydraulic driving system includes an explosion-proof diesel engine 302 and a hydraulic pump 303 arranged in a second explosion-proof compartment 305. The second explosion-proof compartment 305 is in transmission connection with the track 7 through a plurality of hydraulic driving parts 301, and each of the hydraulic driving parts 301 is connected to an oil circuit of the explosion-proof diesel engine 302 through the hydraulic pump 303. The hydraulic driving part 301 is the prior art.

The gear track driving and energy storage system include a first explosion-proof compartment 210 equipped with a power battery pack 209, and an upper end of the first explosion-proof compartment 210 is in transmission connection with the track 7 through a plurality of gear track driving parts 201. The gear track driving part 201 is the prior art.

An explosion-proof motor 202, a speed regulating motor 206 and an explosion-proof permanent magnet generator 208 that are electrically connected with the power battery pack 209 respectively are arranged in the first explosion-proof compartment 210; and the explosion-proof motor 202 is mechanically connected with each of the gear track driving parts 201 through a transmission 203 respectively.

An output end of the speed regulating motor 206 is connected with an input end of the transmission gear 204, and a magnetic clutch b of the transmission gear 204 is mechanically connected with an energy storage flywheel 205. A magnetic clutch c of the transmission gear 204 is mechanically connected with each of the gear track driving parts 201, and a magnetic clutch a of the transmission gear 204 is mechanically connected with the explosion-proof permanent magnet generator 208.

The speed adaptive control system includes a load sensor 402 configured to acquire a load weight of the monorail hoist and installed on the lifting beam 6, an inclination sensor 404 configured to acquire upslope and/or downslope information of the monorail hoist and installed on a top end of the cabin 1, and a speed sensor 405 configured to acquire information of an operating speed of the monorail hoist and installed on the top end of the cabin 1, an electric energy sensor 403 configured to acquire information of an electric power storage and in circuit connection with the power battery pack 209, an engine controller 304 in circuit connection with the explosion-proof diesel engine 302, an AC/DC converter configured to control a charging and/or discharging of the power battery pack 209, a magnetic control valve installed in a hydraulic brake circuit of a brake 9 arranged in the gear track driving part 201 and the hydraulic driving part 301, and a fuzzy PID controller 401 installed in the cabin 1. The fuzzy PID controller 401 includes a single-chip microcomputer and a PID regulator that are electrically connected with each other. A MSP430 single chip microcomputer is selected as the single chip microcomputer. The fuzzy PID regulator 401 is a proportional integral differential fuzzy controller, and the PID regulator is a proportional integral differential controller.

The explosion-proof motor 202, the speed regulating motor 206 and the explosion-proof permanent magnet generator 208 are electrically connected to a motor controller 207 respectively.

The engine controller 304 is arranged in the second explosion-proof compartment 305, and the motor controller 207, the electric energy sensor 403, and the AC/DC converter are arranged in the first explosion-proof compartment 210.

The single-chip microcomputer is electrically connected with the load sensor 402, the electric energy sensor 403, the inclination sensor 404, the speed sensor 405, the motor controller 207, and the AC/DC converter respectively. A target speed is calculated according to operation status information of the load weight, the electric energy storage, the upslope and/or downslope, and the speed of the monorail hoist. The AC/DC converter is a DC/AC bidirectional converter.

The PID regulator calculates a control quantity according to a difference between the target speed and a current speed, and sends a traction or braking command to the motor controller 207, the engine controller 304, a clutch controller of the transmission gear 204 and the magnetic control valve that are electrically connected with the PID regulator, until the monorail hoist reaches the target speed.

During an operation process of the monorail hoist, driving gears in the gear track driving part 201 are permanently rotated in engagement with a rack under the track 7, and switched between a driving and an idling according to the power requirements, energy is recycled to a flywheel energy storage system when being idle.

The cabin 1 and the lifting beam 6 are respectively in transmission connection with the track 7 through a bearing trolley 5.

The cabin 1 is provided with a front one and a rear one. The cabin 1, the hydraulic driving part 301, the gear track driving part 201 and the lifting beam 6 are connected with each other through a connecting bolt 8 in turn.

Further provided by the present disclosure is a method for controlling the series-parallel monorail hoist based on the oil-electric hybrid power, the method is specifically as follows.

The monorail hoist is divided into three types of driving modes including an endurance mode, a transportation mode and a climbing mode, according to conditions of a load weight, an electric power storage, and an upslope and/or downslope.

When a load of the monorail hoist is lower than 40% of a maximum load, it is identified as the low load, when the load of the monorail hoist is higher than 70% of the maximum load, it is identified as the high load.

It is switched to the endurance mode, when the monorail hoist is in a low load or a downslope track, and a pure oil drive or a pure electric drive is selected at this time.

It is switched to the transportation mode, when the monorail hoist is in a high load or a flat track, and an oil-electric hybrid power drive is selected at this time.

It is switched to the climbing mode, when the monorail hoist is in the high load or an upslope track, and an oil-flywheel energy storage system hybrid drive is selected at this time.

An operation in the endurance mode: when the monorail hoist is under the pure oil drive, a single-chip microcomputer controls an explosion-proof motor 202 to be turned off through a motor controller 207, a magnetic clutch b and a magnetic clutch c to be turned on as well as a magnetic clutch a to be turned off through a clutch controller, an explosion-proof diesel engine 302 to be turned on through an engine controller 304; the explosion-proof diesel engine 302 drives a hydraulic driving part 301 to operate through a hydraulic pump 303, a gear track driving part 201 is in a non-driving state, and the flywheel energy storage system is in an energy recovery state to recover idle kinetic energy of driving gears.

When a power battery pack 209 is in a low electric power, the clutch controller controls the magnetic clutch a to be turned on, the magnetic clutch b to be turned on, and the magnetic clutch c to be turned off. The motor controller 207 controls an explosion-proof permanent magnet generator 208 to be turned on, and the speed regulating motor 206 to be turned on. The energy storage flywheel charges the power battery pack 209 through a transmission gear 204 and an explosion-proof permanent magnet generator 208 under a speed regulating control of the speed regulating motor 206, and the flywheel energy storage system is in an energy outputting state.

When the flywheel energy storage system is in an energy storage state, the clutch controller controls the magnetic clutch a to be turned off, the magnetic clutch c to be turned off, and the magnetic clutch b to be turned on. The motor controller 207 controls the speed regulating motor 206 to be turned on. The power battery pack 209 provides energy, and the speed regulating motor 207 maintains the energy storage flywheel in a stable energy storage state through the transmission gear 204.

When the monorail hoist is under the pure electric drive, the engine controller 304 controls the explosion-proof diesel engine 302 to be turned off. The clutch controller controls the magnetic clutch a to be turned off, the magnetic clutch b to be turned off, and the magnetic clutch c to be turned off. The motor controller 207 controls the explosion-proof motor 202 to be turned on. The power battery pack 209 provides power, and the explosion-proof motor 202 drives the gear track driving part 201 to operate through a transmission 203.

An operation in the transportation mode: the single-chip microcomputer controls the magnetic clutch b and magnetic clutch c to be turned off, the explosion-proof diesel engine 302 and the explosion-proof motor 202 to be turned on. The power battery pack 209 provides power, the hydraulic pump 303 drives the hydraulic driving part 301 to operate, and the transmission 203 drives the gear track driving part 201 to operate.

An operation in the climbing mode: the motor controller 207 controls the explosion-proof diesel engine 302 to be turned on, the explosion-proof motor 202 to be turned off, and the speed regulating motor 206 to be turned on. The clutch controller controls the magnetic clutch a to be turned off, the magnetic clutch b to be turned on, and the magnetic clutch c to be turned on. The explosion-proof diesel engine 302 drives the hydraulic driving part 301 to operate through the hydraulic pump 303, the energy storage flywheel drives the gear track driving part 201 to operate through the transmission gear 204 under a speed regulating control of the speed regulating motor 206, and the flywheel energy storage system is in the energy outputting state.

When the gear track driving part 201 climbs a slope, the energy storage flywheel 205 provides an auxiliary torque through the transmission gear 204. The speed regulating motor 206 assists in controlling a rotational speed of the transmission gear 204 and assists the flywheel energy storage system to complete a recovery, an storage, and a release of energy.

A lithium iron phosphate power battery is adopted in the power battery pack 209, it is identified as a low electric power when a power is less than 30% of a total power, and it is identified as a high electric power when the power is greater than 70% of the total power.

An AC/DC converter controls a charging and discharging of the power battery pack 209. When being in the low electric power, the energy storage flywheel in the flywheel energy storage system drives the explosion-proof permanent magnet generator 208 to charge the power battery pack 209 through the transmission gear.

It will be apparent that all kinds of variations and modifications may be made by those skilled in the art in the present disclosure without departing from the spirits and the scopes of the present disclosure. In this way, if these variations or modifications of the present disclosure fall within the protection scope of the claims of the present disclosure and the equivalent technical thereof, the present disclosure also intends to include these modifications and variations.

What is claimed is:

1. A series-parallel monorail hoist based on an oil-electric hybrid power, wherein the monorail hoist comprises a cabin, a hydraulic driving system, a lifting beam, a gear track driving and energy storage system connected in series with each other and travelling on a track;

the hydraulic driving system includes an explosion-proof diesel engine and a hydraulic pump arranged in a second explosion-proof compartment; the second explosion-proof compartment is in transmission connection with the track through a plurality of hydraulic driving parts, and each of the hydraulic driving parts is connected to an oil circuit of the explosion-proof diesel engine through the hydraulic pump;

the gear track driving and energy storage system include a first explosion-proof compartment equipped with a power battery pack, and an upper end of the first explosion-proof compartment is in transmission connection with the track through a plurality of gear track driving parts;

an explosion-proof motor, a speed regulating motor and an explosion-proof permanent magnet generator that are electrically connected with the power battery pack respectively are arranged in the first explosion-proof compartment; and the explosion-proof motor is mechanically connected with each of the gear track driving parts through a transmission respectively; and an output end of the speed regulating motor is connected with an input end of the transmission gear, a magnetic clutch b of the transmission gear is mechanically connected with an energy storage flywheel, a magnetic clutch c of the transmission gear is mechanically connected with each of the gear track driving parts, and a magnetic clutch a of the transmission gear is mechanically connected with the explosion-proof permanent magnet generator.

2. The series-parallel monorail hoist based on the oil-electric hybrid power according to claim 1, wherein the monorail hoist further comprises a speed adaptive control system, the speed adaptive control system includes a load sensor configured to acquire a load weight of the monorail hoist and installed on the lifting beam, an inclination sensor configured to acquire upslope and/or downslope information of the monorail hoist and installed on a top end of the cabin, a speed sensor configured to acquire information of an operating speed of the monorail hoist and installed on the top end of the cabin, an electric energy sensor configured to acquire information of an electric power storage and in circuit connection with the power battery pack, an engine controller in circuit connection with the explosion-proof diesel engine, an AC/DC converter configured to control a charging and/or discharging of the power battery pack, a magnetic control valve configured to control an emergency shut-down and installed in a brake arranged in the gear track driving part and the hydraulic driving part, and a fuzzy PID controller installed in the cabin, the fuzzy PID controller includes a single-chip microcomputer and a PID regulator that are electrically connected with each other;

the explosion-proof motor, the speed regulating motor and the explosion-proof permanent magnet generator are electrically connected to a motor controller respectively;

the single-chip microcomputer is electrically connected with the load sensor, the electric energy sensor, the inclination sensor, the speed sensor, the motor controller, and the AC/DC converter respectively, and a target speed is calculated according to operation state information of the load weight, the electric energy storage, the upslope and/or downslope, and the speed of the monorail hoist; and the PID regulator calculates a control quantity according to a difference between the target speed and a current speed, and sends a traction or braking command to the motor controller, the engine controller, a clutch controller of the transmission gear and the magnetic control valve that are electrically connected with the PID regulator, until the monorail hoist reaches the target speed.

3. The series-parallel monorail hoist based on the oil-electric hybrid power according to claim 2, wherein during an operation process of the monorail hoist, driving gears in the gear track driving part are permanently rotated in engagement with a rack under the track, and switched between a driving and an idling according to power requirements, energy is recycled to a flywheel energy storage system when being idle.

4. The series-parallel monorail hoist based on the oil-electric hybrid power according to claim 3, wherein the cabin and the lifting beam are respectively in transmission connection with the track through a bearing trolley.

5. The series-parallel monorail hoist based on the oil-electric hybrid power according to claim 4, wherein the cabin is provided with at least one of a front cabin or a rear cabin, and the cabin, the hydraulic driving part, the gear track driving part and the lifting beam are connected with each other through a connecting bolt in turn.

6. A method for controlling the series-parallel monorail hoist based on the oil-electric hybrid power according to claim 5, wherein the method is specifically as follows:

dividing, according to conditions of a load weight, an electric power storage, and an upslope and/or downslope, the monorail hoist into three types of driving modes including an endurance mode, a transportation mode and a climbing mode;

switching, when the monorail hoist is in a low load or a downslope track, to the endurance mode, and selecting a pure oil drive or a pure electric drive at this time; identifying, when a load of the monorail hoist is lower than 40% of a maximum load, as the low load;

switching, when the monorail hoist is in a high load or a flat track, to the transportation mode, and selecting an oil-electric hybrid power drive at this time;

identifying, when the load of the monorail hoist is higher than 70% of the maximum load, as the high load;

and switching, when the monorail hoist is in the high load or an upslope track, to the climbing mode, and selecting an oil-flywheel energy storage system hybrid drive.

7. The method for controlling the series-parallel monorail hoist based on the oil-electric hybrid power according to claim 6, wherein an operation in the endurance mode: when the monorail hoist is under the pure oil drive, a single-chip microcomputer controls an explosion-proof motor to be turned off through a motor controller, a magnetic clutch b and a magnetic clutch c to be turned on as well as a magnetic clutch a to be turned off through a clutch controller, an explosion-proof diesel engine to be turned on through an engine controller; the explosion-proof diesel engine drives a hydraulic driving part to operate through a hydraulic pump, a gear track driving part is in a non-driving state, and a flywheel energy storage system is in an energy recovery state to recover idle kinetic energy of driving gears;

when a power battery pack is in a low electric power, the clutch controller controls the magnetic clutch a to be turned on, the magnetic clutch b to be turned on, and the magnetic clutch c to be turned off; the motor controller controls an explosion-proof permanent magnet generator to be turned on, and the speed regulating motor to be turned on; an energy storage flywheel charges the power battery pack through a transmission gear and an explosion-proof permanent magnet generator under a speed regulating control of the speed regulating motor, and the flywheel energy storage system is in an energy outputting state;

when the flywheel energy storage system is in an energy storage state, the clutch controller controls the magnetic clutch a to be turned off, the magnetic clutch c to be turned off, and the magnetic clutch b to be turned on, the motor controller controls the speed regulating motor to be turned on, the power battery pack provides energy, and the speed regulating motor maintains the energy storage flywheel in a stable energy storage state through the transmission gear;

when the monorail hoist is under the pure electric drive, the engine controller controls the explosion-proof diesel engine to be turned off, the clutch controller controls the magnetic clutch a to be turned off, the magnetic clutch b to be turned off, and the magnetic clutch c to be turned off, the motor controller controls the explosion-proof motor to be turned on, the power battery pack provides energy, and the explosion-proof motor drives the gear track driving part to operate through a transmission;

an operation in the transportation mode: the single-chip microcomputer controls the magnetic clutch b and magnetic clutch c to be turned off, the explosion-proof diesel engine and the explosion-proof motor to be turned on, the power battery pack provides power, the hydraulic pump drives the hydraulic driving part to operate, and the transmission drives the gear track driving part to operate; and an operation in the climbing mode: the motor controller controls the explosion-proof diesel engine to be turned on, the explosion-proof motor to be turned off, and the speed regulating motor to be turned on, the clutch controller controls the magnetic clutch a to be turned off, the magnetic clutch b to be turned on, and the magnetic clutch c to be turned on, the explosion-proof diesel engine drives the hydraulic driving part to operate through the hydraulic pump, the energy storage flywheel drives the gear track driving part to operate through the transmission gear under a speed regulating control of the speed regulating motor, and the flywheel energy storage system is in the energy outputting state.

8. The series-parallel monorail hoist based on the oil-electric hybrid power and the controlling method according to claim 7, wherein when the gear track driving part climbs a slope, the energy storage flywheel provides an auxiliary torque through the transmission gear;

the speed regulating motor assists in controlling a rotational speed of the transmission gear and assists the flywheel energy storage system to complete a recovery, a storage, and a release of energy.

9. The series-parallel monorail hoist based on the oil-electric hybrid power and the controlling method according to claim 8, wherein a lithium iron phosphate power battery is adopted in the power battery pack, the power battery pack is identified as a low electric power when a power in the power battery pack is less than 30% of a total power in the power battery pack, and the power battery pack is identified as a high electric power when the power in the power battery pack is greater than 70% of the total power in the power battery pack;

and an AC/DC converter controls a charging and discharging of the power battery pack;

when being in the low electric power, the energy storage flywheel in the flywheel energy storage system drives the explosion-proof permanent magnet generator to charge the power battery pack through the transmission gear.

\* \* \* \* \*